Nov. 4, 1930.                    S. S. CRAMER                    1,780,172
                              ELECTRICAL CONDENSER
                                Filed May 10, 1929
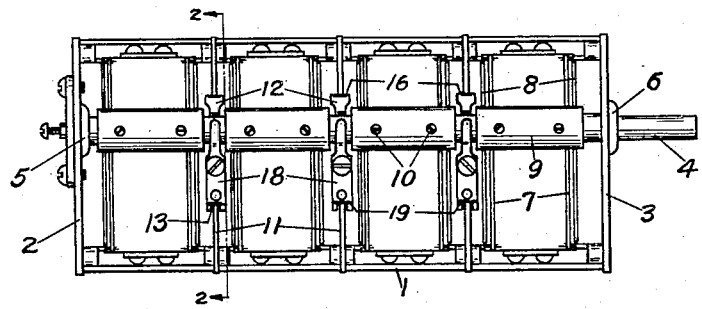
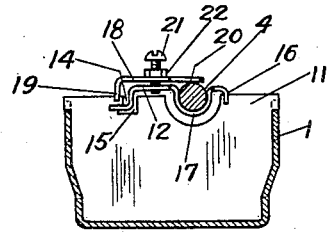   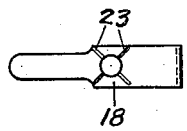
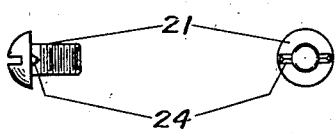
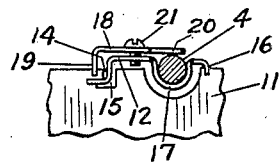
INVENTOR
STANLEY S. CRAMER
BY
A. D. T. Libby
ATTORNEY Patented Nov. 4, 1930

1,780,172

UNITED STATES PATENT OFFICE

STANLEY S. CRAMER, OF HADDON HEIGHTS, NEW JERSEY, ASSIGNOR TO RADIO CONDENSER COMPANY, OF CAMDEN, NEW JERSEY

ELECTRICAL CONDENSER

Application filed May 10, 1929. Serial No. 361,943.

In my application, S. N. 332,700, filed January 15, 1929, I have shown and described a multiple unit or gang condenser designed for radio receiving sets.

In such gang condensers, using a common shaft control, it is difficult where plain bearings are used, spaced apart a considerable distance as they usually are, to get proper alignment of the groups of rotor plates, especially where three or more gang condensers are mounted on the same frame.

In my application above referred to, I have set forth ways and means for overcoming these difficulties by using anti-friction bearings and a construction by which the shaft will line itself up in the framework, and then apply to the rotating system, such as the shaft, a desired amount of friction.

In the application above referred to, I have shown a single strip of metal bent so as to be mounted on a part of the framework, and having a curved portion in the form of a stirrup by which frictional pressure can be applied to the shaft. However, where the shaft bearings are a considerable distance apart, I have found by further experience, that there is some danger of springing the shaft, unless made unduly rigid and heavy, by the frictional applying device shown and described in said application.

It is therefore the object of my present invention to provide a friction-applying device which will overcome any danger along the line above indicated and which will leave the shaft in a perfectly balanced condition.

In order to illustrate my improvement, I have shown in:

Figure 1, a plan view of a four-gang condenser with the rotor system fully in mesh with the stator system, and with the friction-applying device applied to the shaft at points between the individual condensers.

Figure 2 is a view taken on the line 2—2 of Figure 1.

Figure 3 is a plan view of a preferred form of one of the friction-applying members.

Figure 4 is a view of the special screw used for actuating the friction-applying device.

Figure 5 is a view of Figure 4 looking from the right.

Figure 6 is a fragmentary view similar to Figure 2, but using one of the elements of the friction-applying device as illustrated in Figure 3.

In the drawing, 1 is a framework having end support members 2 and 3, and a shaft 4 carried in anti-friction races 5 and 6. Only the outside plates of the stator groups 7 are illustrated. The rotor groups of plates 8 are carried on sleeves 9 fastened to the shaft in any satisfactory manner as by screws 10. No further description of the condenser per se seems to be necessary to make my present improvement understood, except to mention that the frame carries braces 11 on which are preferably mounted the friction-applying devices of my improvement.

This is best illustrated by reference to Figure 2, wherein it will be seen that the friction-applying device is composed of at least two members. One of these, 12, comprises a metallic piece which is formed at one end with a notch 13 to engage under a lug 14 formed by cutting away a portion 15 from the brace 11. The opposite end of the member 12 is bent over at 16 and slotted so as to straddle the brace 11. Intermediate the ends of the member 12, the same is formed into a stirrup 17 which passes around a portion of the shaft 4. A second member 18 of the friction-applying device has one end bent downward at 19 and slotted to straddle the brace 11, and the opposite end 20, extends over the shaft 4 at a point diametrically opposite the point of engagement of the stirrup 17.

The member 18 is held in position with the member 12 by means of a set screw 21 and lock nut 22. It is readily understood that any desired amount of pressure may be applied to the shaft 4 along its length by adjustment of the screws 21 of the different friction-applying devices used.

In Figure 3, I have shown another form of the element 18. In this construction, the member 18 has indentations 23 punched therein. These indentations act as a lock in cooperation with the splines 24 formed on the screw 21. The device shown in Figure 3, is illustrated in the assembly shown in Figure 6, but in either form; i. e., that shown in Figures 2 and 6, the friction or braking effort applied to the shaft is done in such a way as to eliminate all lateral strain, and there is absolutely no tendency for the shaft to shift or bend laterally in its position, and hence no mis-alignment of the rotor plates will result by this manner of applying the friction devices.

Having thus described my invention, what I claim is:

1. In an electrical gang condenser including; a frame, a plurality of groups of stator plates supported by the frame, a rotatable system comprising a single shaft supported by the frame and carrying a plurality of groups of rotor plates for cooperation with said stator groups, said shafts being supported by anti-friction bearings in said frame, and a device for applying a desired amount of friction to said rotatable system; said device consisting of at least two pieces guided by a part of the frame and embracing opposite portions of said shaft, and means for drawing the pieces toward each other to grip the shaft.

2. In an electrical gang condenser including; a frame, a plurality of groups of stator plates supported by the frame, a rotatable system comprising a single shaft supported by the frame and carrying a plurality of groups of rotor plates for cooperation with said stator groups, said shafts being supported by anti-friction bearings in said frame, said frame having braces between said stator groups, and a device for applying a desired amount of friction to said rotatable system; said device consisting of a metallic strip formed at both ends to engage said brace and having a curved portion fitting around a part of said shaft, and a second strip attached to the first strip and having one end guided by said brace while the other end engages said shaft opposite the curved portion of said first strip, the attachment means between the two strips acting also to regulate the friction applied to the shaft by the strips.

3. In an electrical gang condenser including; a frame, a plurality of groups of stator plates supported by the frame, a rotatable system comprising a single shaft supported by the frame and carrying a plurality of groups of rotor plates for cooperation with said stator groups, said shafts being supported by anti-friction bearings in said frame, said frame having braces between said stator groups, and a device for applying a desired amount of friction to said rotatable system; said device consisting of a pair of strips guided in position on said brace and extending on opposite sides of the shaft and into engagement therewith, and means for causing said strips to apply friction to opposite portions of the shaft.

4. In an electrical gang condenser including; a frame, a plurality of groups of stator plates supported by the frame, a rotatable system comprising a single shaft supported by the frame and carrying a plurality of groups of rotor plates for cooperation with said stator groups, said shafts being supported by anti-friction bearings in said frame, said frame having braces between said stator groups, and a device for applying a desired amount of friction to said rotatable system; said device consisting of a pair of strips guided in position on said brace and extending on opposite sides of the shaft and into engagement therewith, a screw for fastening said strips together and for causing them to apply friction to opposite portions of the shaft, and cooperating means on the screw and one of said strips for holding the screw in a given set position.

5. In an electrical gang condenser including; a frame, a plurality of groups of stator plates supported by the frame, a rotatable system comprising a single shaft supported by the frame and carrying a plurality of groups of rotor plates for cooperation with said stator groups, said shafts being supported by anti-friction bearings in said frame, and a device for applying a desired amount of friction to said rotatable system; said device consisting of at least two pieces guided by a part of the frame and embracing opposite portions of said shaft, and a screw for fastening said pieces together and for causing them to apply friction to opposite portions of the shaft, and cooperating means on the screw and one of said pieces for holding the screw in a given set position.

6. In an electrical condenser, a frame, a shaft carried by the frame, a friction-applying device for said shaft including a pair of strips guided in position by a part of the frame and extending on opposite sides of the shaft and into engagement therewith, and means for causing said strips to apply friction to opposite portions of the shaft.

7. In an electrical condenser, a frame, a shaft carried by the frame, a friction-applying device for said shaft including at least two metallic strips guided in position by a part of the frame and extending into engagement with the shaft on opposite portions thereof, a screw for fastening said strips together and for causing them to apply friction to opposite portions of the shaft, and means for holding the screw in adjusted position.

In testimony whereof, I affix my signature.

STANLEY S. CRAMER.